United States Patent

Sandell et al.

[11] Patent Number: 5,418,368
[45] Date of Patent: May 23, 1995

[54] WIDE-ANGLE MOTION DETECTOR WITH CLOSE-IN REFLECTOR

[75] Inventors: Donald R. Sandell, San Jose; Wade P. Lee, Lafayette, both of Calif.

[73] Assignee: Intelectron Products Company, Hayward, Calif.

[21] Appl. No.: 180,611

[22] Filed: Jan. 12, 1994

Related U.S. Application Data

[63] Continuation-in-part of Ser. No. 132,102, Oct. 5, 1993.

[51] Int. Cl.$^6$ .............................................. G01J 5/08
[52] U.S. Cl. ................................. 250/353; 250/DIG. 1
[58] Field of Search ................... 250/353, 342, DIG. 1

[56] References Cited

U.S. PATENT DOCUMENTS

| | | | |
|---|---|---|---|
| 4,575,633 | 3/1986 | Baker et al. | 250/342 X |
| 4,644,147 | 2/1987 | Züblin | 250/221 |
| 4,703,171 | 10/1987 | Kahl et al. | 250/203 |
| 4,752,769 | 6/1988 | Knaup et al. | 340/567 |
| 4,778,996 | 10/1988 | Baldwin et al. | 250/353 |
| 5,083,025 | 1/1992 | Blomberg | 250/353 |
| 5,103,346 | 4/1992 | Chang | 359/855 |
| 5,200,624 | 4/1993 | Pederson, Jr. et al. | 250/353 |
| 5,227,632 | 7/1993 | Armstrong et al. | 250/353 |

*Primary Examiner*—Constantine Hannaher
*Assistant Examiner*—Edward J. Glick
*Attorney, Agent, or Firm*—Elliot B. Aronson

[57] ABSTRACT

A passive infra-red motion detector with wide field of view extending to greater than 180 degrees that can be achieved in a cost-effective manner using a single sensor. The motion detector includes a planar infra-red sensor and two or more infrared-reflecting faces which are positioned close to and overlying at least a portion of the sensor. The reflecting faces are configured so that their ends proximal to the sensor overlie the sensor at its midportion and the faces extend from the midportion in different directions away from one another to reflect radiation to the sensor from different sides of the sensor. In one embodiment the reflecting faces form a generally prismoidal shape. In another embodiment the proximal ends of a pair of faces are displaced laterally from one another over the sensor so that the overlying faces obstruct a portion of the sensor and leave a portion unobstructed to form a checkerboard pattern of obstructed and unobstructed regions. The reflecting faces are positioned close to the sensor with their proximal ends spaced apart from the sensor at most a distance comparable to a characteristic transverse dimension of the sensor. Because of the close proximity of the mirror to the sensor, the area of the reflecting surfaces need not be very large and may be made comparatively small. The mirror surfaces deflect infrared energy from a suitable focusing means onto the sensor from a plurality of zones so as to extend the lateral extremities of the motion detector field of view. Configured in this way, motion detectors may be provided with viewing angles at least up to 220 degrees using a single sensor. The reflecting faces may be formed together with a base from a single member, which also is shaped to receive and hold an integrated-circuit sensor package. The unitary reflecting head and base portion can be mounted directly on a printed circuit board and the reflecting faces are automatically aligned correctly over the sensor.

8 Claims, 4 Drawing Sheets

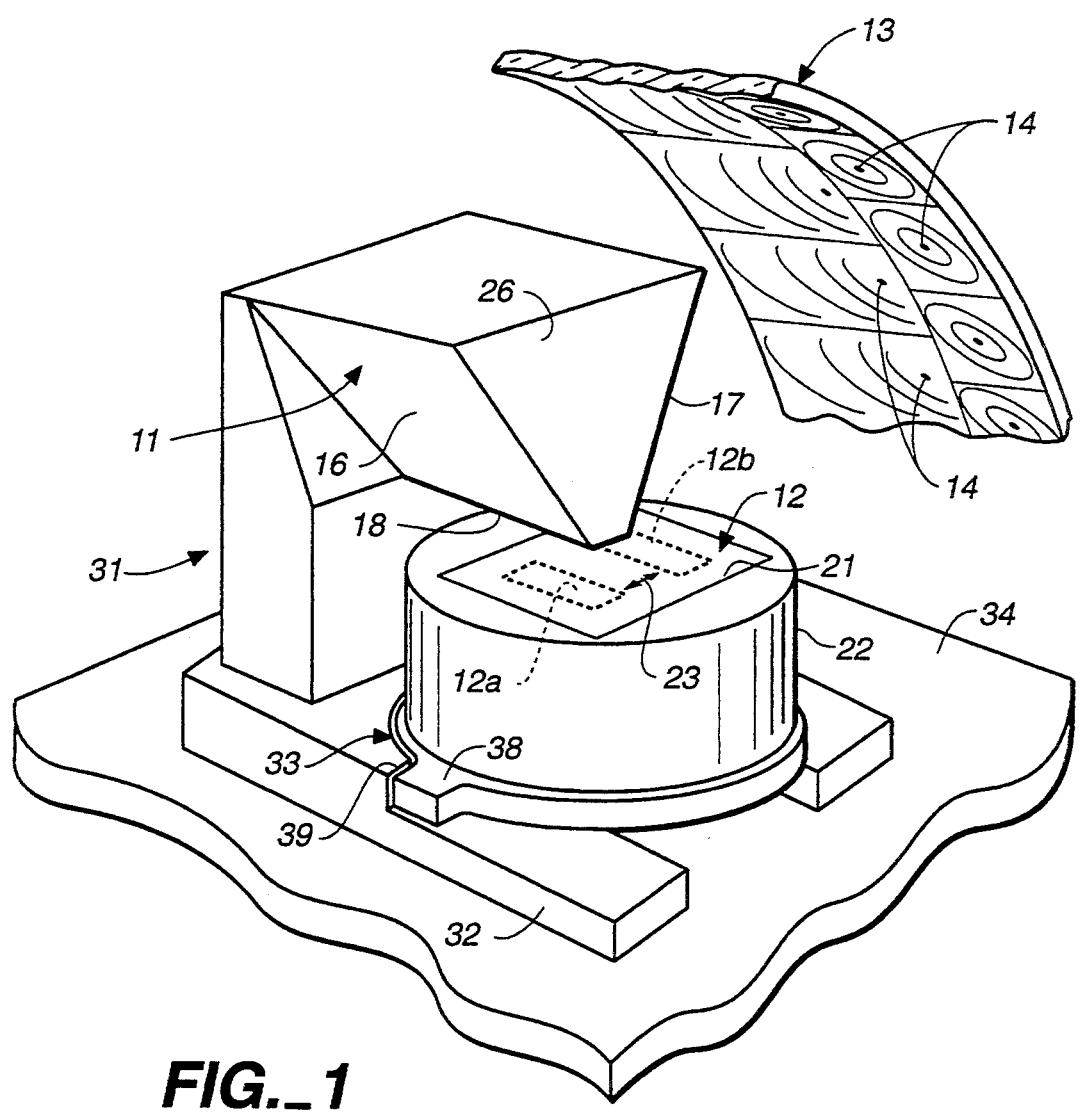
FIG._1

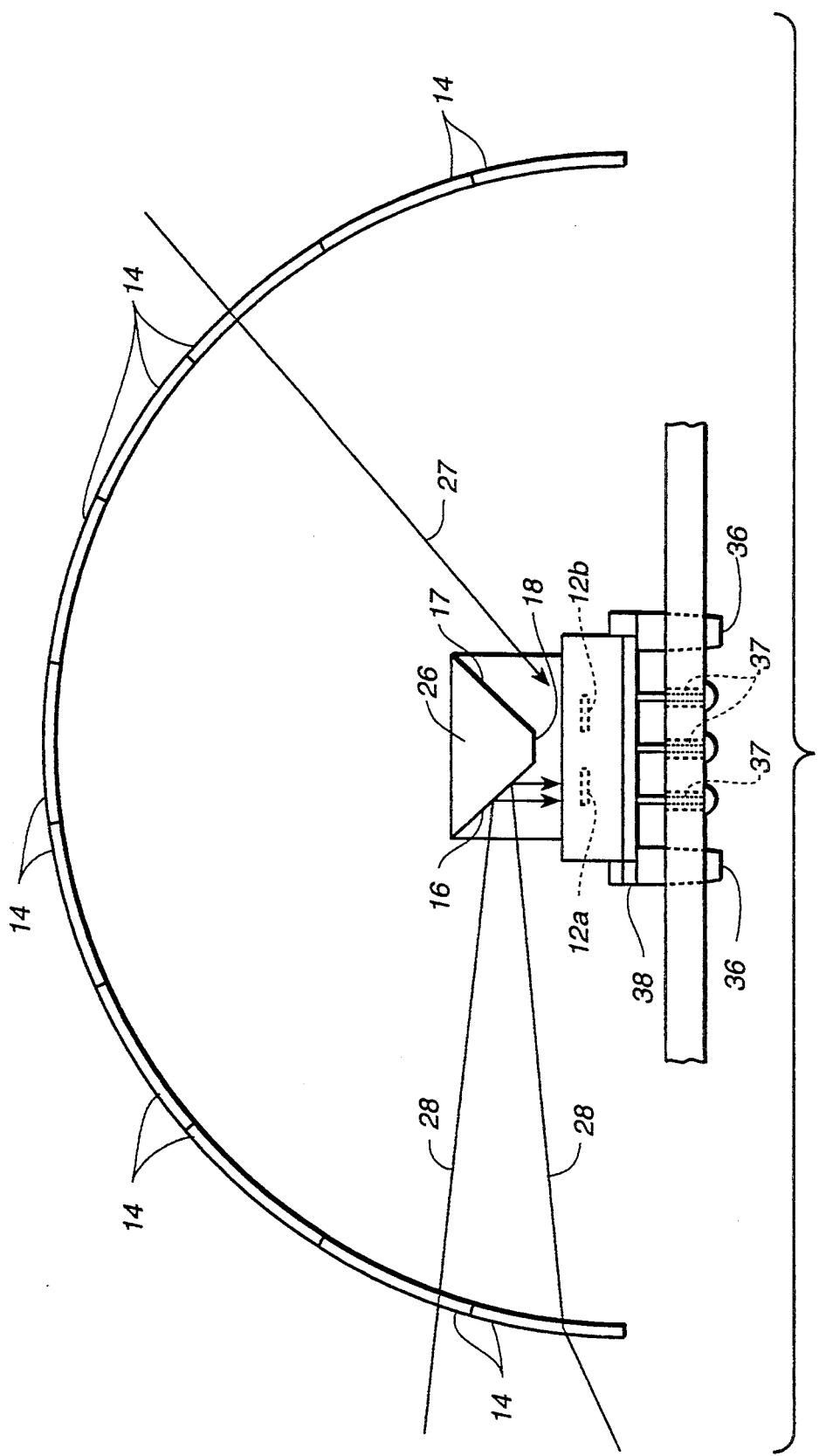
FIG._2

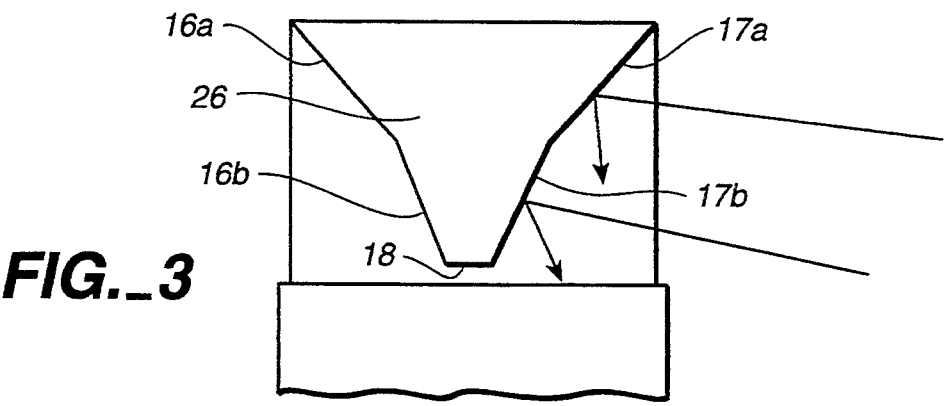
FIG._3
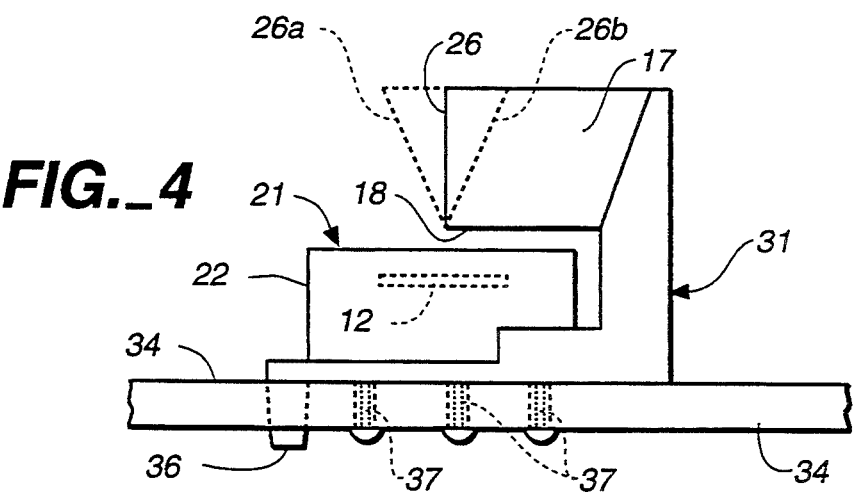
FIG._4

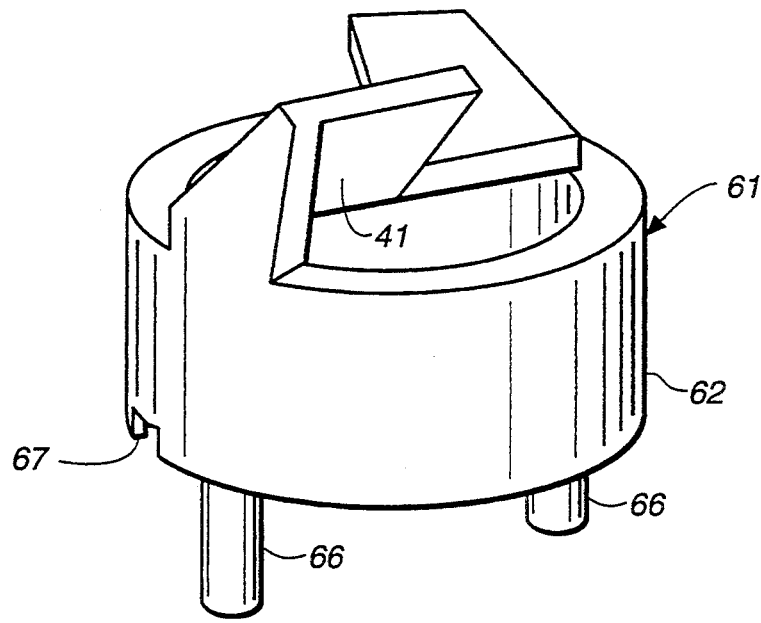
FIG._5
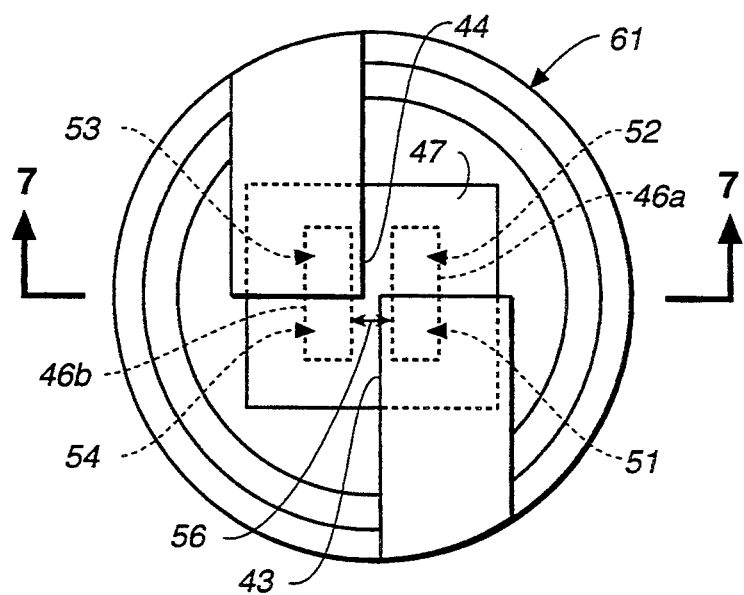
FIG._6
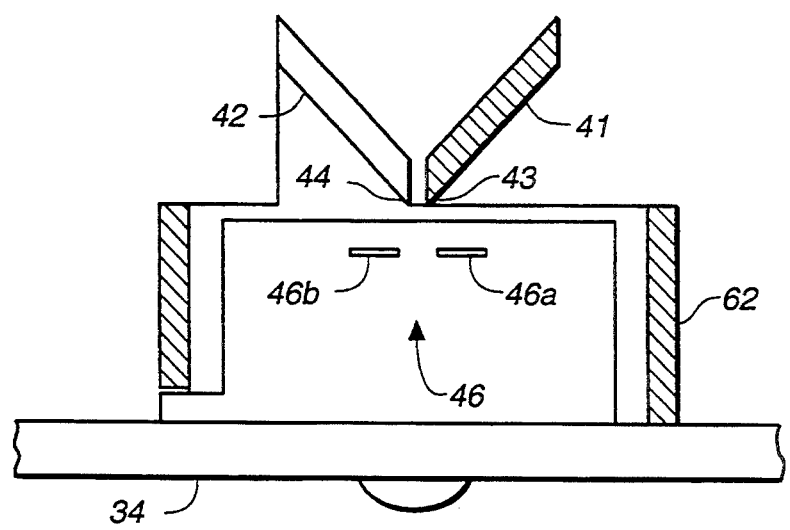
FIG._7

WIDE-ANGLE MOTION DETECTOR WITH CLOSE-IN REFLECTOR

This is a continuation in part of co-pending application Ser. No. 08/132,102 filed Oct. 5, 1993.

BACKGROUND OF THE INVENTION

The present invention relates to passive infra-red motion detection devices and is particularly directed to optical arrangements for achieving a wide field of view.

Infrared motion detection devices are commonly used in automatic light switches and security systems to turn on a light or to activate some other form of alarm or warning indicator when a person or motor vehicle enters a monitored area. Such devices may be used in residential lighting, for example, to illuminate a walkway as a person approaches the front door or to illuminate a driveway as a car approaches. They are also popular as energy saving devices in large office buildings or industrial plants, which may have hundreds of rooms to be illuminated day and night. The motion detection devices can save considerable energy and cost by automatically extinguishing the lights in unoccupied rooms.

The devices function by sensing heat, in the form of infra-red radiation, emanating from a person or similarly warm object as the person or object enters or moves about in the field of view of the device. An arrangement of mirrors and/or lenses directs the incident infra-red radiation to a sensor assembly that may include one or more sensors. When the sensor assembly detects an appropriate heat impulse, the device provides an electrical signal to activate the light or other alarm. A common configuration includes an array of individual lenslets, in which each lenslet focuses infra-red radiation from a particular spatial zone of limited extent to one or more sensors. The field of view of the motion detector is the region of space spanned by the totality of these zones. It is by means of these zones that the motion detector is able to detect motion. In a simple embodiment the motion detector turns on a light or provides other indication whenever a person or other warm object enters a single zone. In more complex embodiments the motion detector can be configured to turn on the light only when the warm object sequentially enters and exits a specified number of zones in this way the motion detector detects movement within its field of view by detecting the heat from the moving object as it enters and exits one or more individual zones in the field of view. The light is typically turned off automatically if no movement is detected within a specified time interval.

There is presently a need for low-cost motion detectors with wide fields of view for monitoring larger areas exceeding the 110-degree field of view commonly found in motion detectors today. Increasing the field of view requires extending the zonal structure to greater areas. To date, this has been achieved by using complicated optics arrangements to direct the radiation from the wide field of view to one or more sensors. Others have achieved wider fields of view by compounding a plurality of detectors, each having a limited field of view, with optical arrangements that bring the incident radiation to the proper sensor. The provision of motion detectors with wide fields of view, however, has generally involved an increase in cost or a compromise in performance or both.

SUMMARY OF THE INVENTION

The present invention provides a motion detector with wide field of view which may extend to greater than 180 degrees and which is achieved in a particularly cost-effective manner using a single sensor. The invention provides a plurality of inclined infra-red mirror faces which are positioned particularly close to the motion detector sensor so as to provide additional zones of sensitivity at outlying angles, Notwithstanding their small size, the inclined mirror faces are able to direct sufficient intensity of radiation to the sensor from the outlying angles to enable the angular sweep of the motion detector's field of view to be increased to greater than 180 degrees. The disposition and small size of the mirror faces lead to significant cost savings.

Briefly, a motion detector formed according to the invention includes a planar infra-red sensor and two or more infrared-reflecting faces which are positioned close to and overlying at least a portion of the sensor, The reflecting faces are configured so that their ends proximal to the sensor overlie the sensor at its midportion and the faces extend from the midportion in different directions away from one another. In this manner the faces are disposed to reflect radiation to the sensor from different sides of the sensor. Because of the close proximity of the mirror to the sensor, the area of the reflecting surfaces need not be large. In general, it need not be greater than about three times the area of the sensor. The reflecting faces deflect infrared energy from a suitable focusing means such as a segmented Fresnel lens onto the sensor from a plurality of zones so as to extend the lateral extremities of the motion detector field of view. Configured in this way, motion detectors may be provided with viewing angles at least up to 220 degrees using a single sensor. In their overlying disposition the reflecting faces necessarily obstruct at least a portion of the sensor and prevent that sensor portion from receiving direct radiation from a primary zone or zones of sensitivity. The inclined mirror faces may be sufficiently small, however, that another portion of the sensor may be left unobstructed to receive radiation directly from the focusing means.

In one embodiment of the invention the proximal ends of a pair of faces are displaced laterally from one another over the sensor. The laterally displaced faces are disposed so that they overlie first and second portions of the sensor, respectively, and obstruct those portions of the sensor from receiving direct radiation. The faces are arranged so that the resulting obstructed and unobstructed sensor portions form a checkerboard pattern.

The reflecting faces may be formed from a single member integrally with a base. The base is shaped to receive and hold an integrated-circuit (IC) sensor package. The integral base/reflecting face member can be mounted directly on a printed circuit board with the IC sensor package, providing for quick and easy assembly and automatically aligning the reflecting faces over the sensor.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is an overall cut-away perspective view of a motion detector according to the invention;

FIG. 2 is an end elevational view of the motion detector of FIG. 1.

FIG. 3 is an end elevational view of an alternative embodiment of a prismoidal mirror for use with the invention.

FIG. 4 is a side elevational view of the motion detector of FIG. 1.

FIG. 5 is a perspective view of an alternative embodiment of a member defining the reflecting faces and base.

FIG. 6 is a plan view of the embodiment of FIG. 5 positioned over a sensor.

FIG. 7 is a cross-sectional view of the embodiment in FIG. 6.

DETAILED DESCRIPTION OF ILLUSTRATIVE EMBODIMENTS

FIG. 1 illustrates an embodiment of a wide-angle passive infra-red motion detector according to the invention. For clarity of exposition the motion detector's external housing has been omitted so that the selected components of the motion detector needed for the exposition below will be plainly visible.

The motion detector embodiment of FIG. 1 includes a prismoidal mirror 11 for reflecting infra-red radiation to a planar infra-red sensor 12. A segmented Fresnel lens array 13 defining a plurality of individual Fresnel lenslets 14 directs radiation from the field of view of the motion detector to mirror 11 and sensor 12. Those skilled in the art of motion detector optics will appreciate from the following descriptions that the benefits of the invention may be achieved with other focusing means besides the segmented Fresnel lens, although the Fresnel lens is advantageous for example because of its compactness, durability and low manufacturing cost.

Mirror 11 has the general shape of a prism comprising two inclined reflecting faces 16 and 17, which are disposed at an angle to one another so that their ends proximal to sensor 12 define a linearly extending apex 18. Although a prism is defined in the field of geometry to have planar faces intersecting in a straight line to form the prism's apex, mirror 11 may depart somewhat from this geometrical definition and still provide the benefits of the invention, and in some instances indicated below may even enhance the benefits of the invention. For example, the apex need not form a sharp straight line, but may be truncated as illustrated in FIGS. 1, 2 and 3. It has been found that mirror 11 exhibits no appreciable loss in performance when the apex 18 is slightly truncated. However, truncating the apex in the manner illustrated in the figures may lead to lower manufacturing cost and may be preferred for that reason. In addition, each individual reflecting face 16 and 17 need not be strictly planar, but may include several planar reflecting facets, such as the two planar reflecting facets 16a, 16b and 17a, 17b illustrated in FIG. 3. Because mirror 11 may depart from the geometrical definition of a prism in these ways and retain the advantages of the invention, the mirror shape is referred to herein as "generally prismoidal" to encompass such alternate geometries.

The invention is able to achieve its wider field of view and lower cost due in great part to the size and positioning of the reflecting faces. In the embodiment of FIG. 1, generally prismoidal mirror 11 is positioned with its apex extending over sensor 12 so that the mirror overlies and hence obstructs at least a portion of the sensor surface. The apex is desirably placed as close as possible to the face of sensor 12 without contacting the sensor face. "Sensor face" means, of course, the outer surface presented by the sensor package, which is usually the surface of a protective window overlying the sensor. Contact between the mirror apex and the sensor surface is to be avoided because it could transmit mechanical vibration, which in turn could cause false activation. The close mirror positioning permits the mirror reflecting faces to be much smaller, which contributes to the cost savings. In addition, with this spacing a poorer quality, and hence lower cost, mirror may be used because the effect of imperfections in the mirror surface will be minimized. While it would ordinarily seem counterproductive to obstruct a portion of the sensor surface from direct illumination by infra-red radiation, in this obstructing position the mirror may be brought in significantly closer to the sensor surface to produce acceptable performance at significant cost savings.

The individual lenslets 14 focus infra-red radiation from their associated spatial zones of sensitivity to sensor 12. When a mirror surface is placed at an angle in the path of an infra-red beam from a lenslet, the beam illuminates an elliptical region on the mirror surface as it is reflected to the sensor. Because of the close proximity of the reflecting faces of mirror 11 to sensor 12, the illuminated ellipse in the present invention is quite small. The surface of reflecting faces 16 and 17 should present a large enough planar area to reflect such an illumination ellipse but need not be any larger. Those skilled in the art of infra-red motion detector optics will readily be able to determine the minimum necessary size of a reflecting face empirically given a specific configuration of sensor size, mirror angle, mirror position, and focal length of the focusing means. In general, however, the surface area of a planar reflecting face disposed according to the invention need be no larger than about three times the sensitive area of the sensor for any practical configuration.

A readily available sensor commonly used in infra-red motion detectors is in the form of an integrated-circuit sensor chip such as depicted in FIG. 1 having a viewing window 21 that includes two side-by-side sensor elements 12a and 12b sealed in an integrated-circuit package 22. The two sensor elements are separated by a linear gap 23. As presently available in commercial detector chips, sensor elements 12a and 12b each have dimensions of about 1 mm by 3 mm and gap 23 is about 1 mm. Thus the size of the array of sensor elements 12a and 12b in such chips may be characterized by the transverse dimension of three millimeters. As a general measure, the proximal ends of the reflecting faces, that is, apex 18 of mirror 11 in the embodiment of FIGS. 1-4, should be positioned spaced apart from sensor 12 by a distance at most equal to the characteristic transverse dimension of the sensor, in this case equal to the aggregate three-millimeter width of the two sensor elements and gap. Where apex 18 is truncated, mirror 11 may be brought in closer to the sensor. The width of the truncation is preferably no greater than the width of gap 23 and the truncated apex is preferably spaced apart from the sensor over the gap by a distance no greater than one-half the width of the gap. That is, for the dimensions of common commercially available detector chips, the width of the truncation is no greater than about 1 mm and the apex need be spaced apart from the chip surface by no greater than 0.5 mm.

As indicated above in reference to the alternative embodiment of FIG. 3, the reflecting faces 16 and 17 need not be planar, but may each be composed of two reflecting planar facets 16a, 16b and 17a, 17b, respectively. Such facets are desirable to highlight certain areas in the field of view. The upper facets 16a and 17a in FIG. 3, for example, serve to provide greater coverage at the lateral extremities of the reflected field of view.

Also as indicated above, a motion detector according to the invention is able use a smaller and less expensive mirror because the mirror is positioned to overlie and hence obstruct at least a portion of the sensor. Depending on sensor size, however, it is not necessary that the mirror completely overlie the sensor. In one embodiment of the invention the mirror end face 26 lies midway over the sensor so that mirror 12 obstructs only a first portion of the sensor and leaves a second portion unobstructed. The unobstructed portion of the sensor may then receive focused infra-red radiation directly from Fresnel lens 13 as represented by ray 27 in FIG. 2 while the obstructed portion is positioned to receive reflected infra-red radiation as represented by rays 28 in FIG. 2. In this way the motion detector is able to recapture some of the dead space in the field of view that would otherwise be created by a fully obstructing mirror. End face 26 may be positioned over the sensor to adjust the relative sensitivity of the direct and reflected energy input to the sensor.

FIGS. 5, 6 and 7 show another embodiment in which only a portion of the sensor is obstructed and a portion is left unobstructed to receive direct radiation. This embodiment includes reflecting faces 41 and 42 with respective ends 43 and 44 proximal to sensor 46 and overlying the sensor at its midportion. A protective window 47 through which the sensor is viewed is also seen in FIG. 6. Sensor 46 depicted in FIGS. 6 and 7 comprises two separate side-by-side sensing elements 46a and 46b. Reflecting faces 41 and 42 function like the reflecting faces 16 and 17 of the embodiment of FIG. 1. They are arranged here, however, with their proximal ends 43 and 44 displaced laterally from one another instead of meeting one another as in the prismoidal configuration discussed above. Faces 41 and 42 extend in opposite directions from one another to reflect radiation coming from opposite directions to the underlying sensor. Face 41 overlies a portion 51 of sensing element 46a and leaves a portion 52 unobstructed. Similarly, face 42 overlies a portion 53 of sensing element 46b and leaves a portion 54 unobstructed. The obstructed and unobstructed quadrants of the sensor form a checkerboard pattern. As illustrated in FIGS. 6 and 7, the reflecting faces are oriented with their proximal ends running parallel to the gap 56 between the sensing elements. This particular orientation of sensing elements and proximal ends of the reflecting faces is not required for operation of the invention. The sensing elements may also be rotated through 90° with respect to the reflecting faces, and other arrangements of sensing elements may be used as well. The embodiment of FIGS. 5, 6 and 7 is used with a semented Fresnel lens or other focusing means in the same manner as the embodiment of FIG. 1.

Because the invention enables the reflecting faces 16 and 17 in the embodiment of FIG. 1 and reflecting faces 41 and 42 in the embodiment of FIG. 5 to be small, the mirror and its mounting may be formed of a single unitary member indicated generally at 31 in FIG. 1 and 61 in FIG. 5. The upper portion of members 31 and 61 defines the reflecting faces and the base portion 32 of member 31 and 62 of member 61 defines a mounting. As illustrated in FIG. 1, base portion 32 is formed with a recessed portion indicated generally at 33 to receive and cradle integrated-circuit package 22 containing the sensor. Member 61 is shown in the form of a cap that slides over a cylindrical integrated-circuit sensor package 63. Members 31 and 61 are mounted on a mounting board 34, which is typically provided by a printed circuit board although other types of mounting could also be used. Base portion 32 (and 62) is formed with two pegs 36 (and 66) which extend through holes in mounting board 34 to fix member 31 (and 61) in position on board 34. The integrated-circuit sensor chip is provided with leads 37 for electrical and mechanical connection to the printed circuit board. Leads 37 extend through holes in the printed circuit board and are secured by soldering to circuit traces on the underside of the board. When integrated-circuit package 22 sits in the receiving portion 33 of member 31 leads 37 extend between the two feet of base portion 32 illustrated in FIG. 1 and through the printed circuit board where they fix both the sensor chip and member 31 to the printed circuit board and maintain the chip and mirror in fixed relative position.

It is important for proper operation of the motion detector that the reflecting faces be aligned correctly with the underlying sensors 12 and 46. To assure proper sensor alignment, integrated-circuit sensor packages are typically provided with an indexing tab 38. Member 31 (and 61) is formed with a corresponding indexing recess 39 (and 67) for positioning indexing tab 38. Because of the unitary structure of member 31, i.e., of mirror 11 and base portion 32, the single operation of lining up indexing tab 38 on the sensor with recess 39 on the base portion automatically assures proper alignment of the mirror over the sensor elements. This simplifies the assembly process and leads to further savings in time and parts needed in mass production of the motion detectors.

Reflecting faces 16, 17, 41 and 42 may be formed of any substance capable of specular reflection in the infra-red energy range, for example, aluminum, chrome-plated plastic, or gold. Thus, for example, members 31 and 61 may be produced by a low-cost plastic fabrication method, and the reflecting faces may be plated with an appropriate reflecting layer. Alternatively, members 31 and 61 may be formed of low-cost infra-red reflecting material.

The above descriptions and drawings disclose illustrative embodiments of the invention. Given the benefit of this disclosure, those skilled in the art will appreciate that various modifications, alternate constructions, and equivalents may also be employed to achieve the advantages of the invention. For example, while the illustrative embodiment disclosed here includes to planar reflecting surfaces, the surfaces may also take on more complex curvatures and shapes. Moreover, although only two reflecting surfaces are illustrated here, those skilled in the art given the benefit of this disclosure will appreciate that more reflecting faces may be included, for example, to boost the sensitivity in desired directions. Therefore, the invention is not to be limited to the above description and illustrations, but is defined by the appended claims.

What is claimed is:

1. A passive infra-red motion detector having a wide-angle field of view comprising:

an integrated-circuit sensor package including a housing and a planar infra-red sensor within said housing;

first and second infrared-reflecting faces positioned externally to said sensor package and having ends proximal to said sensor and ends distal to said sensor, said faces being inclined over said sensor to direct radiation thereto;

wherein said proximal ends overlie said sensor at a midportion thereof, and said first and second faces extend from said midportion in opposite directions to one another, whereby said first and second faces are disposed to reflect radiation to said sensor from lateral regions on opposite sides of said sensor; and wherein said proximal ends are spaced apart from said sensor package at most a distance comparable to a characteristic transverse dimension of said sensor; and focusing means configured to direct infra-red radiation from a plurality of zones in said field of view to said first and second faces for reflection to said sensor.

2. The motion detector of claim 1 wherein said first and second faces are positioned to overlie only a portion of said sensor and to leave a portion of said sensor unobstructed; and said focusing means is arranged to direct infra-red radiation directly to said unobstructed portion of said sensor.

3. The motion detector of claim 2 wherein the proximal ends of said first and second faces are displaced laterally from one another over said sensor, whereby said obstructed and unobstructed portions of said sensor are in checkerboard arrangement.

4. The motion detector of claim 3 wherein said motion detector includes a mounting board on which said integrated-circuit sensor package is mounted, and said motion detector further comprises:

a member having a base portion mounted on said mounting board in the vicinity of said sensor package and an upper portion defining said first and second infrared-reflecting faces.

5. The motion detector of claim 4 wherein the base portion of said member is formed to receive said integrated-circuit sensor package, whereby said sensor package is held in fixed relation to said infrared-reflecting faces.

6. The motion detector of claim 1 wherein said motion detector includes a mounting board on which said integrated-circuit sensor package is mounted, and said motion detector further comprises:

a member having a base portion mounted on said mounting board in the vicinity of said sensor package and an upper portion defining said first and second infrared-reflecting faces.

7. The motion detector of claim 6 wherein the base portion of said member is formed to receive said integrated-circuit sensor package, whereby said sensor package is held in fixed relation to said infrared-reflecting faces.

8. The motion detector of claim 7 wherein said base portion and said integrated-circuit sensor package are indexed to define a fixed alignment of said infrared-reflecting faces with respect to said sensor.

* * * * *